United States Patent
Yamamoto et al.

(10) Patent No.: US 7,265,254 B2
(45) Date of Patent: Sep. 4, 2007

(54) WASTE PROCESSING METHOD, WASTE PROCESSING SYSTEM, INTEGRATED WASTE PROCESSING METHOD, AND INTEGRATED WASTE PROCESSING SYSTEM

(75) Inventors: Yasushi Yamamoto, Chiba (JP); Hisanori Aoyama, Chiba (JP); Tomohisa Yoshikawa, Chiba (JP); Takemi Aizawa, Tokyo (JP); Takamiki Tamashige, Tokyo (JP); Norihiko Misaki, Yamaguchi (JP); Michio Matsuno, Yamaguchi (JP); Yoshimasa Muraoka, Yamaguchi (JP)

(73) Assignee: Taiheiyo Cement Corporation (JP)

( * ) Notice: Subject to any disclaimer, the term of this patent is extended or adjusted under 35 U.S.C. 154(b) by 427 days.

(21) Appl. No.: 10/208,387

(22) Filed: Jul. 30, 2002

(65) Prior Publication Data

US 2003/0023127 A1    Jan. 30, 2003

Related U.S. Application Data

(60) Provisional application No. 60/365,675, filed on Mar. 19, 2002.

(30) Foreign Application Priority Data

Jul. 30, 2001  (JP) .............................. 2001-228964
Feb. 26, 2002  (JP) .............................. 2002-049475

(51) Int. Cl.
   *C07C 1/00*   (2006.01)
(52) U.S. Cl. ..................... 588/316; 588/318; 588/313; 588/406; 588/410; 588/412; 588/415; 106/745; 423/1; 110/342; 110/346

(58) Field of Classification Search ............... 588/316, 588/318, 313, 406, 410, 412, 415; 106/745; 423/1; 110/342, 346
See application file for complete search history.

(56) References Cited

U.S. PATENT DOCUMENTS

| | | | | |
|---|---|---|---|---|
| 4,447,262 | A | * | 5/1984 | Gay et al. .................... 588/314 |
| 5,159,885 | A | * | 11/1992 | Hasebe et al. .............. 110/346 |
| 5,821,395 | A | * | 10/1998 | Price et al. .................. 585/241 |
| 6,124,518 | A | * | 9/2000 | Rasmussen ................. 588/316 |

FOREIGN PATENT DOCUMENTS

| | | | |
|---|---|---|---|
| JP | 6-066417 | A | 3/1994 |
| JP | 8-268740 | A | 10/1996 |
| JP | 11-076995 | A | 3/1999 |
| JP | 11-281040 | A | 10/1999 |
| JP | 2001-54775 | * | 2/2001 |
| JP | 2001-072412 | A | 3/2001 |
| JP | 2001-121103 | A | 5/2001 |
| JP | 2001-198547 | * | 7/2001 |

* cited by examiner

*Primary Examiner*—Steven Bos
(74) *Attorney, Agent, or Firm*—Lerner, David, Littenberg, Krumholz & Mentlik, LLP

(57) ABSTRACT

Chlorine-containing waste is processed inside a heating device, an alkali metal compound and a calcium compound are given into the heating device while the temperature of a solid phase inside the heating device is maintained at 400 to 1500° C., chlorine that is contained in the chlorine-containing waste and that has not been bound by the alkali metal compound is bound in the solid phase by the calcium compound, and chlorine is converted into alkali metal chloride from calcium chloride generated in the course of the processing of the chlorine-containing waste.

11 Claims, 5 Drawing Sheets

WASTE PROCESSING METHOD, WASTE PROCESSING SYSTEM, INTEGRATED WASTE PROCESSING METHOD, AND INTEGRATED WASTE PROCESSING SYSTEM

CROSS REFERENCE TO RELATED APPLICATIONS

The present application claims the benefit of U.S. Provisional Application No. 60/365,675 filed Mar. 19, 2002, now abandoned, the disclosure of which is hereby incorporated by reference herein.

BACKGROUND OF THE INVENTION

The present invention relates to a waste processing method, a waste processing system, an integrated waste processing method, and an integrated waste processing system.

When plastic waste including chlorine such as vinyl chloride is disposed of by combusting, hydrogen chloride is generated from the chlorine components, leading to the problem of corrosion of the machinery and, if hydrogen chloride is emitted into the atmosphere, becomes a cause for environmental pollution. To prevent this, various countermeasures have been proposed for the combustion process, such as providing an exhaust gas processing system. However, none of these countermeasures can be said to be sufficient, and there was the tendency to exclude combustible materials including chlorine from the combustion process.

On the other hand, it has also been attempted to add $CaCO_3$ and bind the hydrogen chloride generated during combustion, such as in RDF technology. However, when the generated calcium chloride is not removed, the combustion residue cannot be used advantageously, so that it was disposed of in landfills or the like.

SUMMARY OF THE INVENTION

The present invention has been conceived in view of the above-described circumstances, and it is an object of the present invention to provide a waste processing method and a waste processing system, in which chlorine stemming from chlorine in chlorine-containing waste, such as chlorine-containing combustible material, can be separated from a residue.

It is another object of the present invention to provide an integrated waste processing method and an integrated waste processing system, in which such a waste processing method is applied, and in which a plurality of wastes of different kinds and natures can be simultaneously detoxified and/or recycled.

One embodiment of the present invention is a waste processing method, wherein chlorine-containing waste is processed inside a heating device, an alkali metal compound and a calcium compound are given into the heating device while the temperature of a solid phase inside the heating device is maintained at 400 to 1500° C., chlorine that is contained in the chlorine-containing waste and that has not been bound by the alkali metal compound is bound in the solid phase by the calcium compound, and chlorine is converted into alkali metal chloride from calcium chloride generated in the course of the processing of the chlorine-containing waste.

In this embodiment, it is preferable that the chlorine-containing waste is a chlorine-containing combustible material, that chlorine-containing combustible material is combustion processed as fuel or as a portion of the fuel in the heating device, the alkali metal compound and the calcium compound are given into the heating device while the temperature of the solid phase inside the heating device is maintained at 400 to 1500° C., chlorine that is contained by the chlorine-containing combustible material and that has not been bound by the alkali metal compound is bound in the solid phase by the calcium compound, and chlorine is converted into alkali metal chloride from calcium chloride generated in the course of the processing of the chlorine-containing combustible material.

In a preferable embodiment of the present invention, the temperature of the solid phase inside the heating device is maintained at 400 to 800° C., and the alkali metal chloride bound in the solid phase is eliminated by washing with water. In this case, it is advantageous that after the elimination of the alkali metal chloride by washing with water, CaO is collected, and reused as the calcium compound into the heating device. In this case, it is also included in this embodiment that CaO that has turned into $Ca(OH)_2$ in the course of washing the alkali metal chloride is given into the heating device as the calcium compound.

In another preferable embodiment of the present invention, the temperature of the solid phase in the heating device exceeds 800° C. and is maintained at a temperature of up to 1500° C., and the alkali metal chloride is separated as gas. In this embodiment, it is advantageous that the temperature of the solid phase in the heating device exceeds 800° C. and is maintained at a temperature of up to 1500° C., gas including the alkali metal chloride is cooled to a temperature not greater than the melting point of the alkali metal chloride, and the alkali metal chloride is separated as solid matter. It should be noted that "the temperature of the solid phase in the heating device exceeds 800° C. and is maintained at a temperature of up to 1500° C." also includes the case that the temperature of the solid phase in a certain region in the heating device exceeds 800° C. and is maintained at a temperature of up to 1500° C. That is to say, there may be an internal environment in which the chlorine in the temporarily formed calcium chloride is converted into alkali metal chloride by a substitution reaction, and the alkali metal compound is gasified within the heating device.

The chlorine-containing combustible material is one form of chlorine-containing waste, and its concept includes chlorine-containing waste plastic. Examples are materials including at least one organic chlorine, such as polyvinyl chloride, polyvinylidene chloride, within the monomers serving as the structural units, and combustible waste into which inorganic compound chlorine such as NaCl (sodium chloride), KCl (potassium chloride) or $CaCl_2$ (calcium chloride) is mixed. Of these, polyvinyl chloride is the most typical processed material. The chlorine included in the chlorine-containing combustible material is preferably in the range of 0.01 to 60 wt %.

For the heating device, it is possible to employ a cement manufacturing device. In this case, it is advantageous to take residue after the elimination of the alkali metal chloride as cement clinker or cement raw material, and to extract the alkali metal chloride from a cement manufacturing furnace.

Furthermore, $Na_2O$ is preferable as the alkali metal compound given into the heating device. In particular, it is preferable that the $Na_2O$ in waste glass is utilized. That is to say, giving waste glass into the heating device is also included in the concept of the present invention. There is no particular limitation to the type of waste glass, and glass types such as sheet glass and automobile glass are included. The present invention can also be used for colored glass, whose use as a resource has conventionally been put aside.

In the present invention, the input amount of alkali metal compounds is set to 0.8 to 1.2 molar equivalents, more preferably 1 to 1.1 molar equivalents with respect to the chlorine included in the chlorine-containing waste. If waste glass is used, its input amount is set in accordance with the proportion of alkali metal compounds included in the waste glass.

Furthermore, a calcium compound is input such that at least 4 molar equivalents are added with respect to the chlorine included in the chlorine-containing waste. As the calcium compound, it is preferable to use at least one calcium compound selected from the group consisting of CaO, $CaCO_3$ (e.g. limestone) and $Ca(OH)_2$. Such a calcium compound can be input in the form of a mixture including the calcium compound. That is to say, it is also possible to use waste cement as what is called calcium compound here. Moreover, it is also possible to use waste lime that has been used for the processing of chlorine-containing gas.

In another aspect of the present invention, a waste processing apparatus includes, in one embodiment, a heating device forming alkali metal chloride upon input of chlorine-containing waste and an alkali metal compound, and a water washing device for washing with water a residue including that alkali metal chloride.

In another embodiment, a waste processing apparatus of the present invention includes a heating device forming alkali metal chloride upon input of chlorine-containing waste and an alkali metal compound, an extraction device for extracting all or a portion of gas including that alkali metal chloride, a cooling device for obtaining a solid by cooling the extracted gas to a temperature not greater than the melting point of the alkali metal chloride, and a collecting device for collecting the obtained alkali metal chloride.

In yet another embodiment, the present invention is an integrated waste processing method, wherein alkali metal-containing inorganic waste, inorganic waste other than alkali metal-containing inorganic waste, chlorine-containing combustible material, and chlorine-free combustible waste are taken as processed materials, the respective amounts of the processed materials that are given into a waste heating facility are regulated, a portion of the chlorine included in the processed materials is reacted with a heavy metal in the processed materials, the chlorine in the other main portion is neutralized by the alkali metal in the processed materials, and a heat amount obtained by combusting the chlorine-containing combustible material and the chlorine-free combustible waste is utilized as processing energy of the waste heating facility, while an obtained reaction product is moved into exhaust gas and removed from the system. In this integrated waste processing method, it is advantageous that, when R is a mol number of the alkali metal included in the processed materials, S is a mol number of sulfur present as sulfate radicals in the processed materials, and Cl is a mol number of the chlorine included in the processed materials, then the input amounts of the various processed materials are regulated such that the mol numbers fulfill the relation $1 \leq (R-2S)/Cl \leq 1.2$.

In this integrated waste processing method, it is advantageous that 5 to 40 wt % of all material that is input into the waste heating facility is auxiliary material.

In this integrated waste processing method, it is advantageous that heavy metals included in dust obtained from the waste heating facility are subjected to a wet process, and the heavy metals are concentrated and collected. It is advantageous that salts are collected from drainage water discharged from the wet processing step.

Here, it is advantageous that residual heat of the exhaust gas of the heating facility is used for evaporating and eliminating water components in a facility for wet processing the heavy metals included in the dust or a facility for collecting the salts, or for promoting dissolution of heavy metal salts.

Here, it is further included as an embodiment that the processed materials after the heating process are discharged from the heating facility in powder form or in clinker form. It is also included as an embodiment that the processed materials after the heating process are discharged from the heating facility in molten form.

In this integrated waste processing method, it is advantageous that a calcium compound as described above is given into the heating facility as auxiliary material.

It is included as one embodiment of the integrated waste processing method, that a rotary kiln is used as the heating facility, the chlorine-containing combustible material and the chlorine-free combustible waste are combusted inside that rotary kiln, and cement raw material or a cement admixture is obtained. It is further included as one embodiment, that the chlorine-free combustible waste is given into a cooler at a stage following the waste heating facility.

In yet another aspect of the present invention, an integrated waste processing system for working the integrated waste processing method includes a storage facility for holding the processed materials, a heating facility for breaking down and/or separating harmful substances in the processed materials, a fuel making facility turning the chlorine-containing combustible material and the chlorine-free combustible waste of the processed materials into fuel for the heating facility, a monitoring facility monitoring the nature of the processed materials, a cooling facility transforming the harmful substances present in form of liquid or gas in the exhaust gas of the heating facility into a solid, and a dust gathering facility for gathering dust including the solid, and, according to necessity, further includes a facility selected from a foreign matter elimination facility for removing foreign matter from the processed materials, a pre-processing facility for transforming the processed materials into a packing style suitable for processing, a proportional mixing facility for balancing the processed materials, and a separation facility for returning dust with a coarse particle size in the exhaust gas to the heating facility.

As a monitoring facility for monitoring the nature of the processed materials, a fluorescent X-ray analysis device analyzing the content (proportion) of chlorine, $SO_3$ (sulfur present as sulfate radicals), and alkali metals in the processed materials by fluorescent X-rays. The heating facility can be provided with a facility for adding alkali metal-containing substances.

In a preferable embodiment, this integrated waste processing system includes a facility for concentrating and collecting heavy metals included in the dust by wet processing. In this case, it is advantageous that it includes a facility for collecting salts from the exhaust water discharged by the wet processing step.

In a preferable embodiment, the heating facility of this integrated waste processing system includes a facility for adding an alkali metal-containing substance. A rotary kiln is one form of such a heating facility. Furthermore, heating furnaces other than a rotary kiln are also included as another embodiment of the heating facility.

It should be noted that throughout this specification, "collecting" also includes, in addition to the meaning ordinarily understood by the person skilled in the art, obtaining as a valuable compound something that has been "only separated", "only removed" or "separated" or "removed."

Furthermore, throughout this specification, "heating device" means not only combustion device, but also includes the concepts of external heating furnaces.

BRIEF DESCRIPTION OF THE DRAWINGS

The following is an explanation of the present invention with reference to the embodiments shown in the accompanying drawings, wherein.

DETAILED DESCRIPTION OF THE PREFERRED EMBODIMENTS

Waste Processing Method of Moving into Solid Phase/Washing with Water

The present invention is explained first for an embodiment relating to a waste processing method and a waste processing system, in which processing is carried out while maintaining the temperature of the solid phase inside the heating device at 400 to 800° C.

Figure 1:
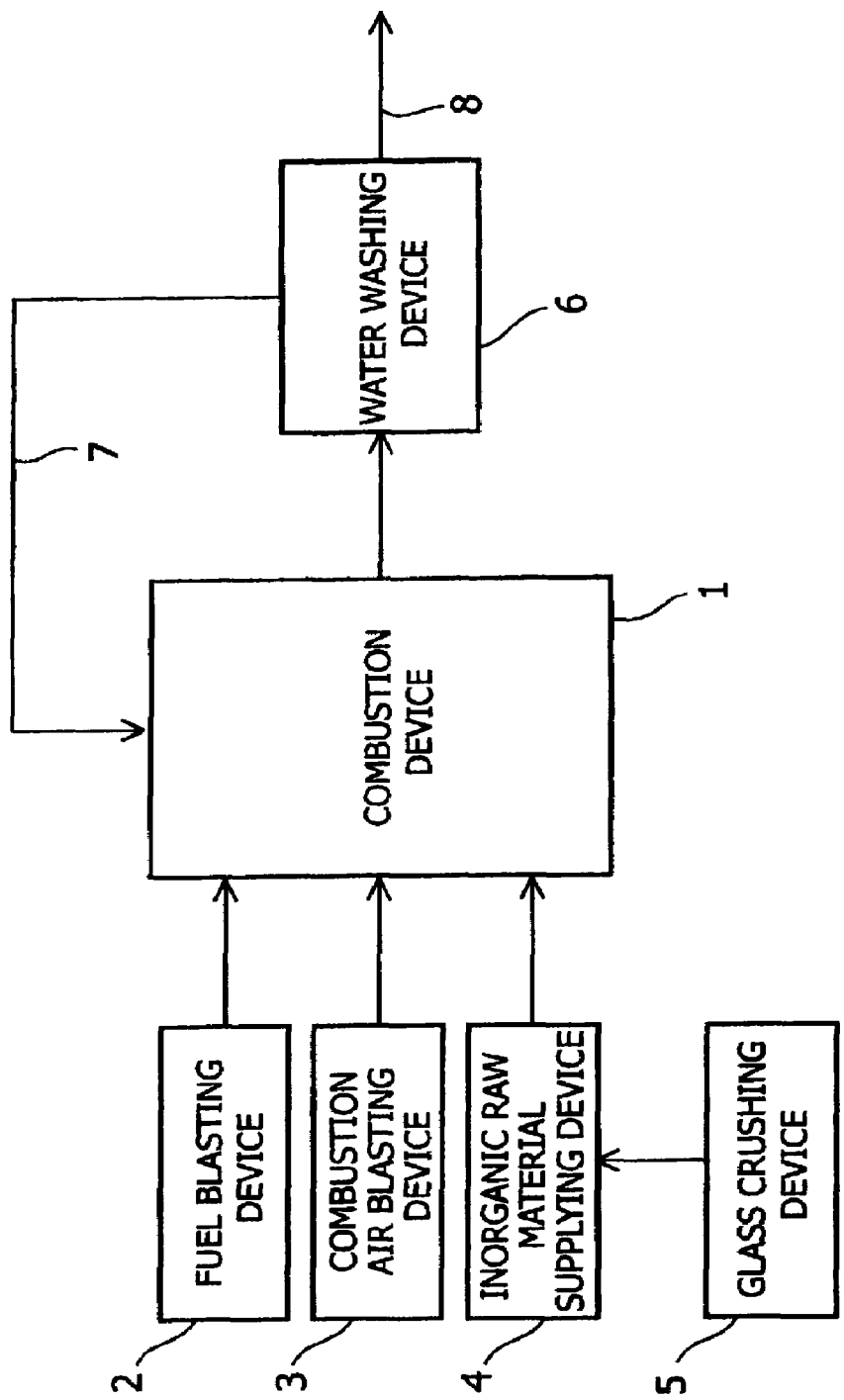
FIG. 1 is a conceptual diagram illustrating a comprehensive embodiment of a waste processing method in accordance with the present invention.

FIG. 1 is a conceptual diagram showing an outline of an embodiment of a system for working a waste processing method in accordance with the present invention.

In this embodiment, a combustion device 1 is a device that combusts, as fuel, chlorine-containing combustible material, which is the material to be processed by the present invention. That is to say, in this embodiment, the heating device is embodied by a combustion device. For the combustion device 1, it is possible to employ a melt furnace, a cyclone combustor, a fluidized bed combustion furnace, a draft flush furnace, a garbage incinerator, or a cement manufacturing device. However, there is no limitation to these. When, of these, a cement manufacturing device is adopted, then it is possible to adopt any type of device, such as the type equipped only with a cement combustion furnace, such as a rotary kiln, or the type that is also equipped with a suspension pre-heater or a precalciner.

Furthermore, as shown in FIG. 1, the combustion device 1 is connected to devices for supplying raw materials, namely, a fuel blasting device 2, a combustion air blasting device 3, and an inorganic raw material supplying device 4.

It is preferable that the fuel blasting device 2 uses chlorine-containing materials as fuel, and takes only such materials as fuel. However, it is also possible to provide a device such as a burner that combusts fuels such as heavy oil or pulverized coal, when unburned gas develops or in order to start up the device.

The combustion air blasting device 3 is a device for supplying oxygen or air for the combustion, for which a means for blasting air, such as a blower, can be employed.

The inorganic raw material supplying device 4 is supplied with glass particles from a glass crushing device 5. Furthermore, calcium compounds are supplied from another device not shown in the figure. It should be noted that the glass particles and the calcium compounds can be supplied to the combustion device 1 after mixing them, or they can be supplied separately to the combustion device 1.

Furthermore, a water washing device 6 is provided at the rear end of the combustion device 1.

The following is an explanation of a waste processing method using the system in FIG. 1.

Chlorine-containing combustible material is supplied from the fuel blasting device 2 to the combustion device 1. At the same time, air is blasted from the combustion air blasting device 3 into the combustion device 1.

On the other hand, waste glass is crushed by the glass crushing device 5, preferably into particles of not more than 1 mm particle size.

By inputting alkali metal compounds to the waste glass, the proportion of alkali metal compounds included in the waste glass is set to 0.8 to 1.2 molar equivalents, more preferably 1 to 1.1 molar equivalents, with respect to the chlorine included in the chlorine-containing combustible material. The alkali metal compound is mainly $Na_2O$, but it can also be $K_2O$.

Calcium compounds are separately given into the inorganic raw material supplying device 4. The input amount is such that the added amount of calcium is at least 4 molar equivalents, preferably at least 8 molar equivalents, with respect to the chlorine included in the chlorine-containing combustible material. It is preferable that the calcium compound is at least one calcium compound selected from the group consisting of CaO, $CaCO_3$ (e.g. limestone), and $Ca(OH)_2$. Furthermore, these calcium compounds also can be input in the form of a mixture including the calcium compound. That is to say, it is possible to use for example waste cement for what is referred to as calcium compounds here. It is also possible to use waste ashes after they have been used for the processing of chlorine-containing gas.

In the combustion device 1, hydrogen chloride is generated from the input chlorine-containing combustible material, such as chlorine-containing waste plastic. In the course of the combustion process of the chlorine-containing material, which is the main raw material, the temperature inside the combustion device 1 rises to 500° C. or the vicinity thereof. As a result, the chlorine in the chlorine-containing combustible material is turned into hydrogen chloride.

The hydrogen chloride reacts with the $Na_2O$ in the input waste glass, and is turned into sodium chloride and water. In the case of $K_2O$, it is turned into potassium chloride.

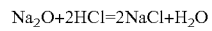

$Na_2O+2HCl=2NaCl+H_2O$

In this embodiment, in which there are 0.8 to 1.2 molar equivalents of the sodium in the waste glass with respect to the chlorine, it is not possible to convert all of the hydrogen chloride into sodium chloride.

On the other hand, the calcium compounds that are input into the combustion device 1 are present in the device as CaO, and react with hydrogen chloride in the following manner.

$$CaO+2HCl=CaCl_2+H_2O$$

It should be noted that under the condition that $Ca/Cl_2>2$, almost all of the remaining chlorine that is not bound by the sodium in the waste glass is bound temporarily in the solid phase in form of calcium chloride. In this embodiment, the added amount of calcium is at least 4 molar equivalents with respect to the chlorine included in the chlorine-containing combustible material, and consequently substantially all of the chlorine temporarily takes on the form of sodium chloride or calcium chloride. It should be noted that in order to bind it even more reliably to the solid phase, it is preferable that there are at least 8 molar equivalents of calcium with respect to chlorine.

Furthermore, if the processing conditions in the combustion device 1 are for example 500° C. for at least 20 min, then all or almost all of the chlorine is converted into sodium chloride by the following reaction. In the case that $K_2O$ is added, it is converted into potassium chloride.

$$CaCl_2+Na_2O=CaO+2NaCl$$

The combustion device 1 may be a batch processing device or a continuously processing device.

The conditions of 500° C. for at least 20 min are only an example, and according to tests performed by the inventors, the conditions should be set such that $Y \geq 7676\exp^{-0.0118X}$ is fulfilled, wherein X is the temperature (in ° C.), and Y is time (in min), as shown in the working examples.

As noted above, the solid phase temperature in the combustion device 1 is not greater than 800° C., so that almost all of the chlorine in the chlorine-containing combustible material is bound as salt in the solid phase. A temperature not greater than 800° C. can be achieved almost entirely by combustion of chlorine-containing combustible material, and even if another auxiliary fuel is used, a very small amount thereof is sufficient. In any case, the processed zones are exposed to the above-noted processing conditions.

The generated material (residue) that is retrieved from the combustion device 1 includes CaO, silica, iron, aluminum components and alkali metal chlorides, such as sodium chloride. In the present embodiment, this residue is washed in water by the water washing device 6. Thus, the alkali metal chloride in the residue can be washed away with water. The residue from which the alkali metal chloride has been eliminated is fed to the subsequent stage by a line 8. The residue can be used as cement raw material.

By returning a portion of the residue via a line 7 directly to the combustion device 1 or to the inorganic raw material supplying device 4, the calcium compound can be used again to remove chlorine. That is to say, it can be used as a kind of catalyst.

As can be seen from the above explanations, in the present embodiment of a waste processing method of the present invention, chlorine stemming from the chlorine in the chlorine-containing combustible material can be separated from the residue.

With the waste processing method according to the embodiment explained with FIG. 1, the chlorine in the chlorine-containing combustible material and the alkaline components (sodium, potassium, etc.) in the waste glass are proactively utilized, and can be removed as alkali metal chlorides. It does not matter if the waste glass is colored glass, so that colored glass that has no utility besides being scrapped can be utilized advantageously.

Figure 2:
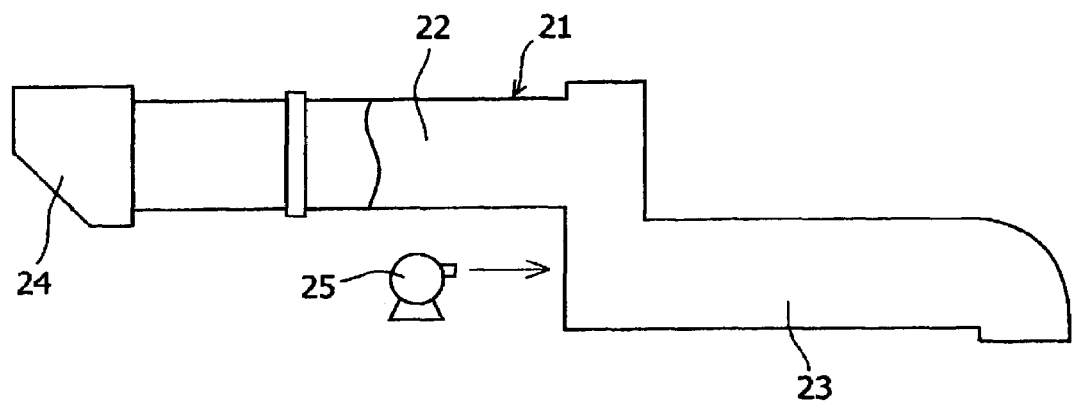
FIG. 2 is a conceptual diagram illustrating an embodiment in which a waste processing method in accordance with the present invention is worked using a rotary kiln.

Next, an embodiment of a waste processing method of the present invention utilizing a rotary kiln for cement manufacturing as shown in FIG. 2 is described.

This rotary kiln 21 includes a main unit 22 and a clinker cooler 23. The rotary kiln 21 is provided with a raw material input port 24. The clinker cooler 23 has a fan 25 for introducing cooling air.

Referring to FIG. 2, the following is an explanation of the operation mechanism of the present embodiment.

In the present embodiment, crushed waste glass and limestone powder are introduced.

The waste glass is cracked by a cracker. The cracked material is then supplied from a supplier to the above-mentioned crusher, and crushed into particles with a maximum particle size of not more than 1 mm. The glass particles obtained by crushing are supplied to a mixer via a volumetric feeding device not shown in the figure.

The limestone powder (of about 30 μm average particle size) and the waste glass mixed in the mixer are input as glass-containing raw material through the raw material input port 24 into the main unit 22 of the rotary kiln. The mixer is not shown in FIG. 2, but it forms a portion of the inorganic raw material supplying device 4 of FIG. 1.

On the other hand, the chlorine-containing combustible material is cracked by the cracker. The cracked material is supplied from a supplier to the shredder and is shredded preferably to 3 mm or less. Thereafter, the shredded material is fed via an oscillating sieve to a volumetric supplier of the fuel blasting device, and from the volumetric supplier supplied to a feeder and blown by a blower into the main unit 22 of the rotary kiln. It should be noted that FIG. 2 shows only the rotary kiln 21. The blower is part of the fuel blasting device in FIG. 1.

The input proportion of the limestone powder and the waste glass with respect to the chlorine-containing combustible material follows the explanations in FIG. 1.

The chlorine-containing combustible material is combusted inside the main unit 22 of the rotary kiln, by air provided from a blower not shown in the figure. If the combustion device 1 in FIG. 1 is taken for the main unit 22 of the rotary kiln, then the reaction mechanism is similar to the one explained for FIG. 1.

That is to say, all or almost all of the chlorine is converted into sodium chloride. If $K_2O$ is added, then it is converted into potassium chloride.

The residue from the main unit 22 of the rotary kiln is discharged, inserted into the clinker cooler 23, and cooled with air supplied by the blower 25.

The residue retrieved from the clinker cooler 23 is subjected to a water washing process and alkali metal chlorides are removed in the same manner as explained for FIG. 1.

The residue can be used as cement raw material.

It should be noticed that the rotary kiln 22 is provided with a precalciner, so that for example if the combustion is not sufficient, the original main fuel combustion device, such as the burner for sintering, can be repurposed as a combustion device for the auxiliary fuel.

Furthermore, the rotary kiln 22 can be employed for batch processing, but suitable for continuous processing.

The device for working the method explained with FIG. 1 and FIG. 2 is further provided with a sensor and a control device, not shown in the figure.

That is to say, the sensor detects the chlorine concentration in the exhaust gas and the amount of alkali metals contained in the waste glass, and the entire device is constantly regulated such that the chlorine, the alkali metals and the calcium are stoichiometrically balanced, so that the waste processing method in accordance with the present embodiment can be worked properly.

Here, in the embodiment of FIG. 2, a rotary kiln was used for the combustion device in FIG. 1, but the technological scope of the present invention also includes the use of other combustion devices. Moreover, in the embodiment of FIG. 2, a rotary kiln was used, but it is also possible to use a fluidized bed combustion furnace or other types of reactors, such as a rotary kiln with a suspension preheater or a precalciner.

In the embodiment of FIG. 2, a mixture of limestone powder and waste glass was input. However, it is also possible to input them separately.

Furthermore, in the embodiments of FIGS. 1 and 2, the heating device is taken to be a combustion device. However, it is also possible to take an external heating furnace instead of the combustion device, and combust the combustible gas generated by thermal decomposition in a subsequent secondary combustion furnace to neutralize the hydrogen chloride gas. Thus, it is possible to work an embodiment in which processing is performed while maintaining the temperature of the solid phase in the heating device at 400 to 800° C. The heating device can be embodied as a heating furnace that does not involve a combustion operation.

WORKING EXAMPLE 1

Sodium carbonate and calcium chloride are mixed to a ratio of Na/Cl=1.0. More specifically, 55.6 g and 53.0 g of them were mixed.

The mixture was given into an electric kiln and reacted. After the reaction, the unreacted calcium in the sample was measured by X-ray diffraction, and the time when the peak of the calcium chloride disappeared was taken as the reaction termination time.

Figure 3:
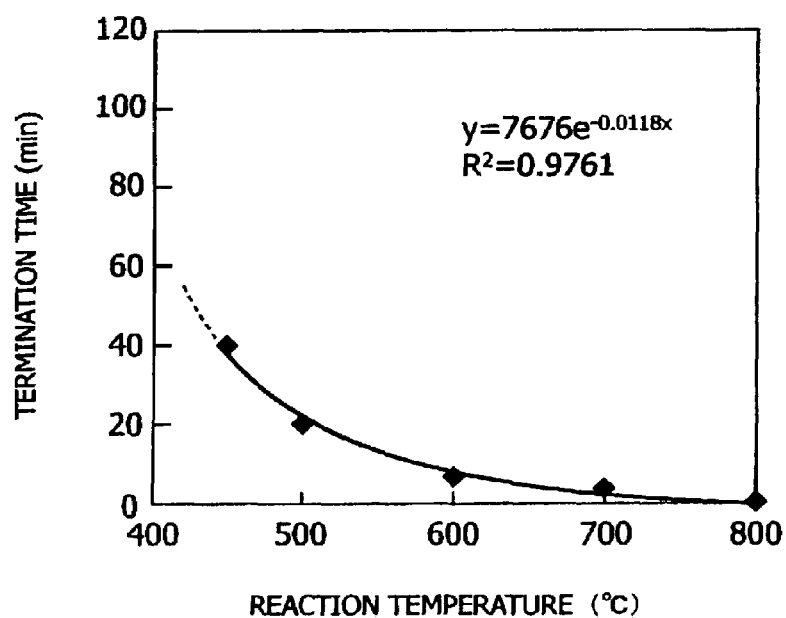
FIG. 3 is a graph showing the experimental results regarding temperature parameters and time parameters used in a waste processing method in accordance with the present invention.

FIG. 3 is a graph that was produced from the actual measurement results. An approximate expression that was calculated for this graph is $Y=7676\exp^{-0.0118X}$, wherein X is the temperature (in ° C.) and Y is time (in min). Consequently, this was formalized to the formula of the condition $Y \geq 7676\exp^{-0.0118X}$, stated above.

In this manner, with the embodiment explained with FIG. 1 to FIG. 3, chlorine stemming from the chlorine in chlorine-containing waste can be separated from the residue by maintaining the solid phase within the combustion device at 400 to 800° C., moving the chlorine that has moved into the solid phase from the calcium compounds into the sodium compounds, and further eliminating it by washing with water.

Gas Separation-Type Waste Processing Method

The following is an explanation of an embodiment, in which chlorine-containing waste is processed while maintaining the solid phase in the heating device at a temperature greater 800° C. and up to 1500° C.

Figure 4:
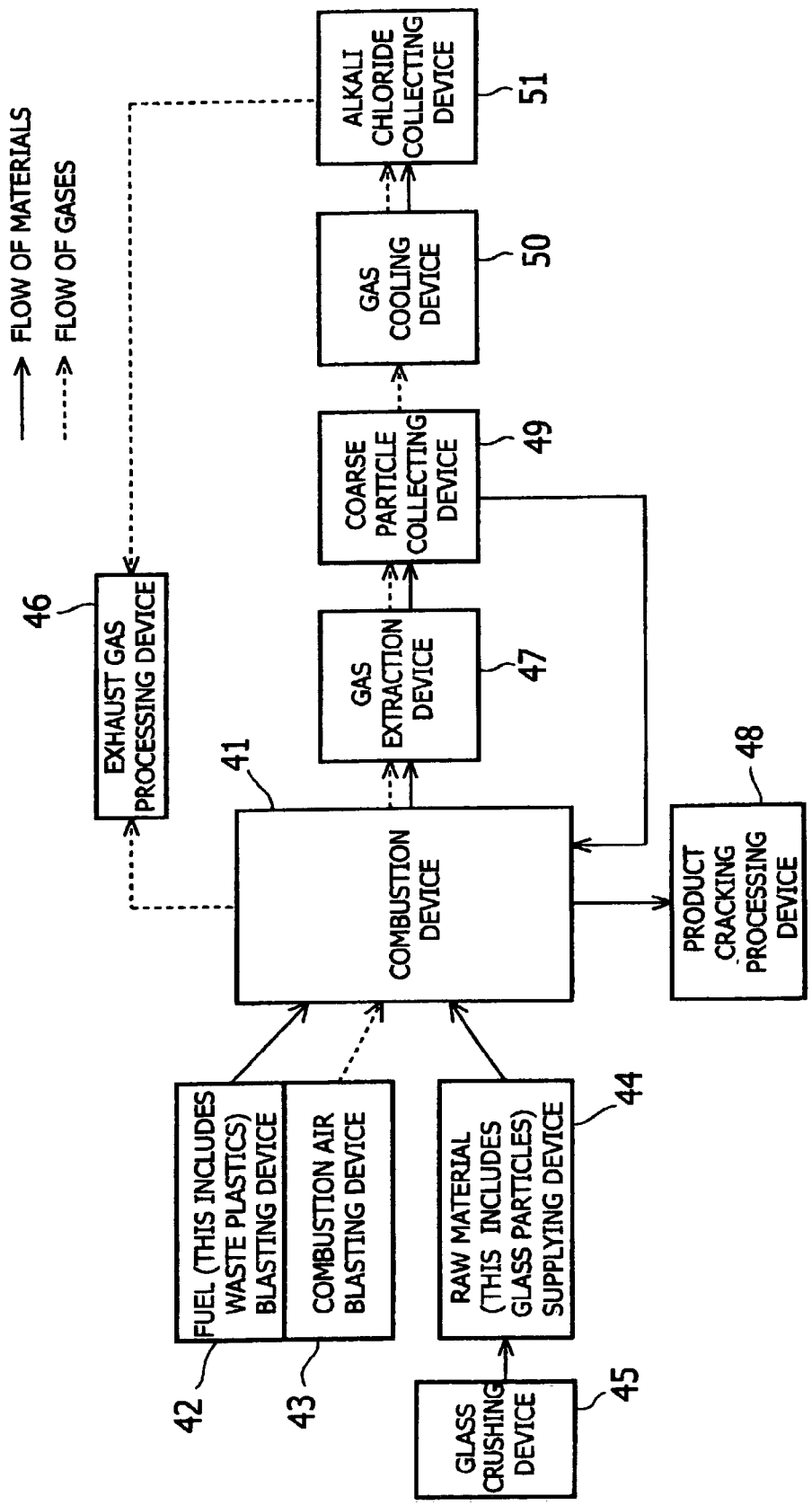
FIG. 4 is a conceptual diagram illustrating another comprehensive embodiment of a waste processing method in accordance with the present invention.

FIG. 4 is a conceptual diagram showing an outline of another embodiment of the waste processing method and system in accordance with the present invention. In this embodiment, the heating device is embodied by a combustion device 41.

In this embodiment, the combustion device 41 is a device that combusts chlorine-containing combustible material, which is the material to be processed by the present invention, as fuel or as a portion of the fuel. For the combustion device 41, it is possible to employ a melt furnace, a cyclone combustor, a fluidized bed combustion furnace, a draft flush furnace, a garbage incinerator, or a cement manufacturing device. However, there is no limitation to these. When, of these, a cement manufacturing device is adopted, then it is possible to adopt any type of device, such as the type equipped only with a cement manufacturing device, such as a rotary kiln, or the type that is also equipped with a suspension pre-heater and equipped with a precalciner.

Furthermore, as shown in FIG. 4, the combustion device 41 is connected to devices for supplying raw materials, namely, a fuel blasting device 42, a combustion air blasting device 43, and a raw material supplying device 44.

The fuel blasting device 42 uses only chlorine-containing combustible material as fuel, or it uses chlorine-containing combustible material for some of the fuel. In the case of a cement manufacturing device, chlorine-containing combustible material is used as auxiliary fuel with respect to the main fuel for sintering, such as heavy oil or pulverized coal.

The combustion air blasting device 43 is a device for supplying oxygen or air for the combustion, and it is possible to employ an air blasting means for it, for example a blower.

Glass particles are supplied to the raw material supplying device 44 from a glass crushing device 45. Depending on the type of combustion device 41 and the way it is used, the raw material may be only glass particles, or it may include other raw materials besides the glass particles. In the case of a cement manufacturing device, glass is admixed to the cement raw material. It should be noted that the glass and the other raw materials can be supplied to the combustion device 1 after pre-mixing them, or they can be supplied separately to the combustion device 1.

However, if only glass particles are used, then calcium compounds are input into the combustion device 41 at a proportion such that there are at least 4 molar equivalents, preferably at least 8 molar equivalents of calcium with respect to the chlorine included in the chlorine-containing combustible material.

Furthermore, the combustion device 41 is connected to discharge devices, namely an exhaust gas processing device 46, a gas extraction device 47, and a product cracking device 48.

For the exhaust gas processing device 46, it is possible to adopt a denitrification device, a dust collection device, a desulphurization device, a dioxin elimination device or the like.

Together with a coarse particle collecting device 49, a gas cooling device 50, and an alkali chloride collecting device 51, the gas extraction device 47 constitutes a serial system for separating gas including alkali metal chlorides.

The product cracking processing device 48 is a residue crushing processing device for the case that only a residue is left after the separation of the alkali metal chlorides. The type of product cracking processing device 48 depends on what kind of combustion device 41 is used. For example, if the combustion device 41 is a cement manufacturing device, then it is a cement mill.

The solid lines in the figure indicate the flow of materials, whereas the dotted lines indicate the flow of gas.

The following is an explanation of the operation of the waste processing device in FIG. 4.

Chlorine-containing combustible material is supplied from the fuel blasting device 42 to the combustion device 41 as fuel or as a portion of the fuel. At the same time, air is blasted into the combustion device 41 from the combustion air blasting device 43. On the other hand, glass is crushed with the glass crushing device 45 to particles of preferably not more than 1 mm maximum particle size. If the glass is admixed to cement raw material or the like, then it is fed in by the raw material supplying device 44 at a proportion of 0.001 to 100 parts by weight, preferably 0.01 to 100 parts by weight with respect to 100 parts by weight of the other raw materials such as the cement raw material. The raw material supplying device 44 supplies glass into the combustion device 41.

In this embodiment, the remaining chlorine that has not been bound by the sodium in the waste glass is temporarily bound in the solid phase in form of calcium chloride. In this situation, when cement raw material is used, the calcium in the cement raw material reacts with the chlorine. If a calcium compound is input separately, then the calcium in this calcium compound reacts with the chlorine.

In the combustion device 41, substantially all the chlorine temporarily takes on the form of sodium chloride or calcium chloride, as in the embodiment in FIGS. 1 to 3.

An aspect that is different is that in this embodiment, an area is provided, in which the temperature of the solid phase in the combustion device 41 is maintained at least 800° C., and preferably at 1000 to 1500° C. Thus, the chlorine in the calcium chloride that has temporarily moved into the solid phase is turned into sodium chloride by a substitution reaction, and is furthermore gasified.

In the embodiment in FIG. 4, all or some of the gas including alkali metal chlorides is extracted by the gas extraction device 47. The extracted gas is separated into coarse particles and gas by the coarse particle collecting device 49. The coarse particles are returned to the combustion device 41. Furthermore, the gas is fed into the gas cooling device 50, the alkali metal chlorides are solidified, and collected with the alkali metal chloride collecting device 51. The exhaust gas from the alkali metal chloride collecting device 51 is fed into the exhaust gas processing device 46.

It should be noted that in this embodiment, it is assumed that the gas cooling device 50 cools the alkali metal chlorides to their melting point or below. However, it is also possible to provide the gas extraction device 47 itself with a cooling means, which cools the alkali metal chlorides to their melting point or below, and the cooling with the gas cooling device 50 further cools the exhaust gas to an extent at which their collection with the subsequent alkali metal chloride collection device 51 becomes possible. This is also included as an embodiment of the present invention.

The remainder of the gas generated in the combustion device 41 that has been extracted is fed into the exhaust gas processing device 46.

After the combustion, the product, for example cement, or the residue is discharged from the combustion device 41 into the product crushing device 48.

With the separation method or separation device of alkali metal chlorides in accordance with FIG. 4, the chlorine in the chlorine-containing combustible material and the alkali components (such as sodium and potassium) in the waste glass are proactively utilized, and can be separated as alkali metal salts, for example NaCl or KCl. It does not matter if the waste glass is colored glass, so that colored glass that has no utility besides being scrapped can be utilized advantageously.

Figure 5:
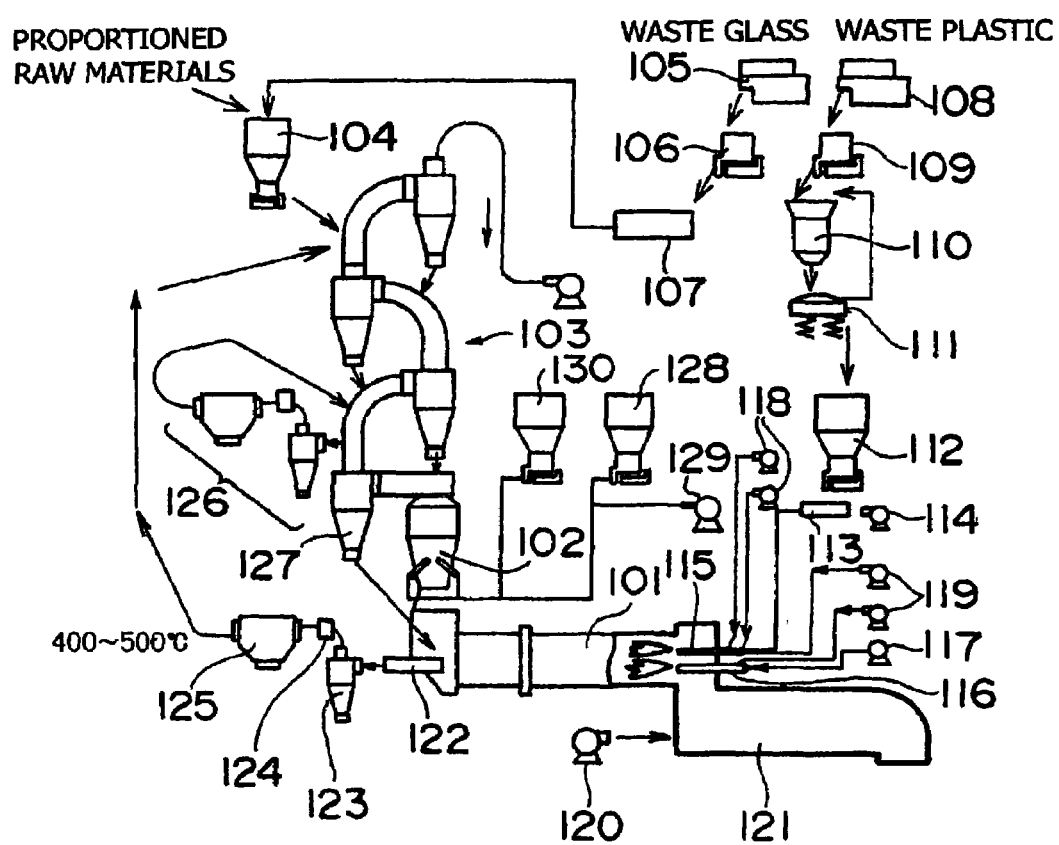
FIG. 5 is a conceptual diagram illustrating an embodiment in which the waste processing method and device comprehensively shown in FIG. 4 is worked for a cement manufacturing device.

Next, FIG. 5 illustrates a cement manufacturing device that is an embodiment of a waste processing method and system in FIG. 4.

The cement manufacturing device of this embodiment includes a rotary kiln 101, a precalciner 102, and a suspension preheater 103 as the main devices. The explanation of aspects of configuration, operation and function of these main devices that are the same as in the related art has been omitted. The following is an explanation of this embodiment, following its operation mechanism.

In this embodiment, glass and compound raw material are given into a mixer 104. The compound raw material is made of cement raw materials, such as limestone and clay, that are mixed at suitable proportions. A preferable mixing proportion is 0.001 to 50 parts by weight, preferably 0.01 to 50 parts by weight of glass to 100 parts by weight of cement raw material.

The glass is cracked by a cracker 105. The cracked glass is supplied from a supplier 106 to a crusher 107, and crushed to particles of not more than 1 mm particle size. The glass particles obtained by crushing are supplied to the mixer 104 by a volumetric supplying device not shown in the figure.

The cement raw material and the glass that are mixed with the mixer 104 are supplied as glass-containing raw material to the uppermost stage of a suspension heater 103, and are preheated, just like ordinary cement raw material.

On the other hand, the chlorine-containing combustible material is cracked by a cracker 108. The cracked material is supplied by a supplier 109 to a shredder 110 and shredded, preferably to 3 mm or less. Thereafter, the shredded material is fed through an oscillating sieve 111 to a volumetric supplier 112 of the plastic blasting combustion device, supplied from the volumetric supplier 112 to a ejector 113, and blasted by a blower 114 via a burner 115 into the rotary kiln 101.

The rotary kiln 101 is further provided with a main burner 116. Main fuel, such as heavy oil, or pulverized coal is fed into this main burner 116 from a fuel supply pump 117.

The main fuel and the chlorine-containing combustible material are combusted inside the rotary kiln 101 by the air from the blowers 118 and 119, and the cement raw material (cement-containing raw material) is sintered. The chlorine-containing combustible material can substitute, as auxiliary fuel, up to at least 30% by calories of ordinary main fuel. Preferably, its mixing ratio is 10 to 30% by calories.

The cement clinker discharged from the rotary kiln 101 is fed into a clinker cooler 121, and cooled with air supplied from a blower 120.

With the separation device for alkali metal chlorides in accordance with the embodiment in FIG. 5, alkali metal components such as sodium and potassium in the glass are separated in a process of heating the cement raw material including glass particles with the suspension preheater 103, precalcining with the precalciner 102, and sintering with the rotary kiln 101. The alkali metal components react with the chlorine in the combusted chlorine-containing combustible material, and form alkali metal chlorides.

Furthermore, the chlorine that has not completely reacted with alkali metals is temporarily moved as calcium chloride into the solid phase within the rotary kiln 101. However, when it reaches a region in which the solid phase in the rotary kiln 101 is maintained at a temperature greater than 400° C. and up to 1500° C., then also the calcium chloride within the solid phase is converted to alkali metal chlorides, and furthermore gasified.

The exhaust gas including these alkali metal chlorides is extracted from the inlet hood of the rotary kiln 101 by an extraction device 122, such as an extraction blower. Coarse particles in the extracted exhaust gas are separated by a classifying cyclone 123. The coarse particles are returned to the rotary kiln 101. Then, the exhaust gas is cooled by a cooling device 124 to 400 to 500° C. Thus, the alkali metal compounds are solidified. The exhaust gas containing these solids is fed to a high-temperature bag filter 125. This high-temperature bag filter 125 acts as an alkali metal chloride collecting device, which collects alkali metal chlorides and recycles the exhaust gas (of 400 to 500° C.) to the uppermost stage of the suspension preheater 103.

It should be noted that for the cooling device 124, it is possible to use the most ordinary type performing heat exchange between cooling air and the exhaust gas.

Furthermore, if the extraction device 122 is an extraction probe, the extraction device 122 itself can be provided with a cooling means, which cools the alkali metal chlorides to their melting point or below, and the cooling device 124 cools the exhaust gas further down to the extent that collecting with the subsequent high-temperature bag filter (alkali metal chloride collecting device) 125 becomes possible.

This embodiment is provided with a separate upper-stage bypass system 126, in addition to the bypass system including the extraction device 122. This bypass system 126 has a similar configuration as the bypass system including the extraction system 122, and is provided at the outlet port of the lowest-stage cyclone 127.

The waste processing device in accordance with the embodiment in FIG. 5 is further provided with sensors and a control device, which are not shown in the figure.

That is to say, sensors detect the chlorine concentration in the exhaust gas and the amount of alkali metal contained in the waste glass, and the overall device is constantly controlled such that the chlorine and the alkali metals are stoichiometrically balanced, so that the separation method in accordance with the present invention can be worked properly.

When the alkali metal chloride separation method and system in accordance with the embodiment in FIG. 5 are worked in a cement manufacturing device, the chlorine inside the chlorine-containing combustible material and the alkali components (such as sodium and potassium) in the waste glass can be proactively utilized, and can be separated as alkali metal salts, for example NaCl or KCl. Also the silica components in the waste glass can be advantageously utilized as a portion of the cement raw material. It does not matter if the waste glass is colored glass, so that colored glass that has no utility besides being scrapped can be utilized advantageously.

In addition, there is the synergistic effect that a portion of the main fuel of the cement manufacturing device can be substituted by waste plastic.

Here, in the embodiment in FIG. 5, a cement manufacturing device was used as the combustion device in FIG. 4, but the technological scope of the present invention also includes using other combustion devices.

Moreover, in the embodiment in FIG. 5, the cement manufacturing device is a rotary kiln with a suspension preheater and a precalciner, but it can also be any other type of reactor, such as a fluidized bed combustion furnace. Also, the present invention can also be worked with a cement manufacturing device that is not provided with a precalciner and/or a suspension preheater.

Furthermore, in the embodiment in FIG. 5, cement raw material and glass are mixed, and input as glass-containing raw material. However, it is also possible to input them separately. For example, it is possible to supply only cement raw material, as described above, to the uppermost stage of the suspension preheater 103 (fourth cyclone), and to supply the glass separately at one of the lower stages (first to third cyclone). In the embodiment in FIG. 2, the device into which the waste glass is input is the suspension preheater at the uppermost stage. However, it can also be supplied from the burner side.

The device into which the chlorine-containing combustible material is input supplies it as fuel from the same position as the fuel. However, as long as it does not impede the operating purpose of the cement manufacturing device, it is also possible to supply it to the precalciner, or to supply it together with the cement raw material, like the waste glass. If it is supplied to the precalciner, then it is possible to substitute a portion or all of the main fuel with substitute fuel. That is to say, in the precalciner 102 of FIG. 5, coal is supplied from a volumetric supplier 128, and ventilation air is supplied from a blower 129. In addition or instead of this main fuel, it is possible to supply chlorine-containing combustible material, such as waste plastic, from a volumetric supplier 130. Furthermore, the chlorine-containing combustible material can be input at the inlet hood (the kiln input port, i.e. opposite from the burner), in which case it can also be input in uncrushed form.

In the embodiment of FIG. 5, a high-temperature bag filter 125 is used as the bag filter. This is in order to increase the heating efficiency when reusing the extracted gas. However, as long as it does not compromise the operating conditions of the device, it is also possible to use an ordinary bag filter.

In the embodiments of FIG. 4 and FIG. 5, the chlorine-containing combustible material is used in its crushed form as fuel. However, the present invention also includes gasifying such chlorine-containing combustible material into combustible gas, and combusting this combustible gas in the combustion device.

With the waste method and system in accordance with the embodiment in FIG. 4 and FIG. 5, the chlorine in the chlorine-containing combustible material and the useful components in the waste glass can be proactively utilized, and the alkali metal compounds can be separated. As a result, chlorine-containing combustible materials, such as chlorine-containing plastic, that was conventionally scrapped, can be advantageously exploited for heating or as raw material.

Integrated Waste Processing

By applying the waste processing method and system explained for the embodiments in FIGS. 1 to FIG. 5, it is possible to work a method for the integrated processing of waste. This integrated waste processing method is explained in the following.

The waste that is subjected to processing with such an integrated waste processing method or system is as follows.

(1) alkali metal-containing inorganic waste: for example waste glass or earthenware which can be used as an alkali metal source. The amount of alkali metal included in the alkali metal-containing inorganic waste should be 1 to 50 wt %, preferably 3 to 50 wt %.

(2) inorganic waste other than alkali metal-containing inorganic waste: materials including inorganic chemical components that are polluted with heavy metals, organic chlorine compounds or oils and that include organic components can be reused as raw material for the building material industry, such as ash from garbage incineration, fly ash, garbage melting fly ash, and soil. It should be noted that due to the nature of waste, there is almost no case in which no alkali metals are included at all, so that waste including less than 1 wt % of alkali metals is regarded as such inorganic waste.

(3) chlorine-containing combustible material: examples of chlorine-containing combustible material that is subjected to integrated waste processing are waste polyvinyl chloride products, which include chlorine and produce toxic byproducts such as dioxin when directly incinerated. Examples include scrapped polyvinyl chloride sheets that are used for greenhouses in the field of agriculture, polyvinyl products occurring as construction scraps, electric wiring and sheathing materials thereof, shredder dust due to the scrapping of cars, shredder dust due to the scrapping of electric household appliances, and so forth. It should be noted that the amount of chlorine contained in the chlorine-containing combustible material is 0.01 to 60 wt %, preferably 0.5 to 50 wt % and even more preferably 1 to 50 wt %.

(4) chlorine-free combustible waste: This includes waste plastics that contain only little chlorine components, but the final disposal of which is problematic. In the true sense of the word, this kind of plastics refers to plastics that do not include any chlorine. However, due to the nature of waste, it is very rare that there is absolutely no chlorine included. Thus, in the present invention, waste with a chlorine content of less than 0.5 wt % is processed as chlorine-free combustible waste. Moreover, chlorine-free combustible waste includes wood chips, rubber, waste tires, and carbides thereof.

When the phrase "processed material" is used in the explanations regarding the integrated waste processing, then it is not only used as a concept including all of alkali metal-containing inorganic waste, inorganic waste other than alkali metal-containing inorganic waste, chlorine-containing combustible material, and chlorine-free combustible waste, which serve as the processing raw materials of the present invention, but may also refer to only some of those kinds of waste such as alkali metal-containing inorganic waste and inorganic waste other than alkali metal-containing inorganic waste, input into the following rotary kiln. Moreover, it may also be used to include auxiliary materials input into the heating facility in addition to these kinds of waste. Moreover, in addition to referring as "processed material" to the material before the processing, "processed material" may also refer to material after processing, when convenient. It should be noted that in embodiments in which the processed material is given into the rotary kiln, it is denoted in particular as "heated material."

As will become clearer from the following explanations, in the integrated waste processing method and system in accordance with this embodiment, inorganic waste including ash from garbage incineration, fly ash, garbage melt furnace fly ash or heavy metals and chlorine, and combustible waste is used as the raw material, the input amount is controlled when inputting raw material, toxic heavy metals and chlorine are separated by mixing the types of waste, combustible waste can be reused as fuel, inorganic materials from which heavy metals and chlorine have been eliminated can be recycled as raw material for the building material industry, such as cement, and the separated heavy metals and chlorines can be collected as valuables in a form that can be easily recycled. Moreover, with this integrated waste processing method, compared to a method of manufacturing cement directly from waste, there is no need for a strict limitation of the mass ratio of the chemical elements constituting the cement, so that it becomes possible to utilize waste that could not be utilized conventionally, and to increase the process proportion of waste with respect to auxiliary materials.

Figure 6:
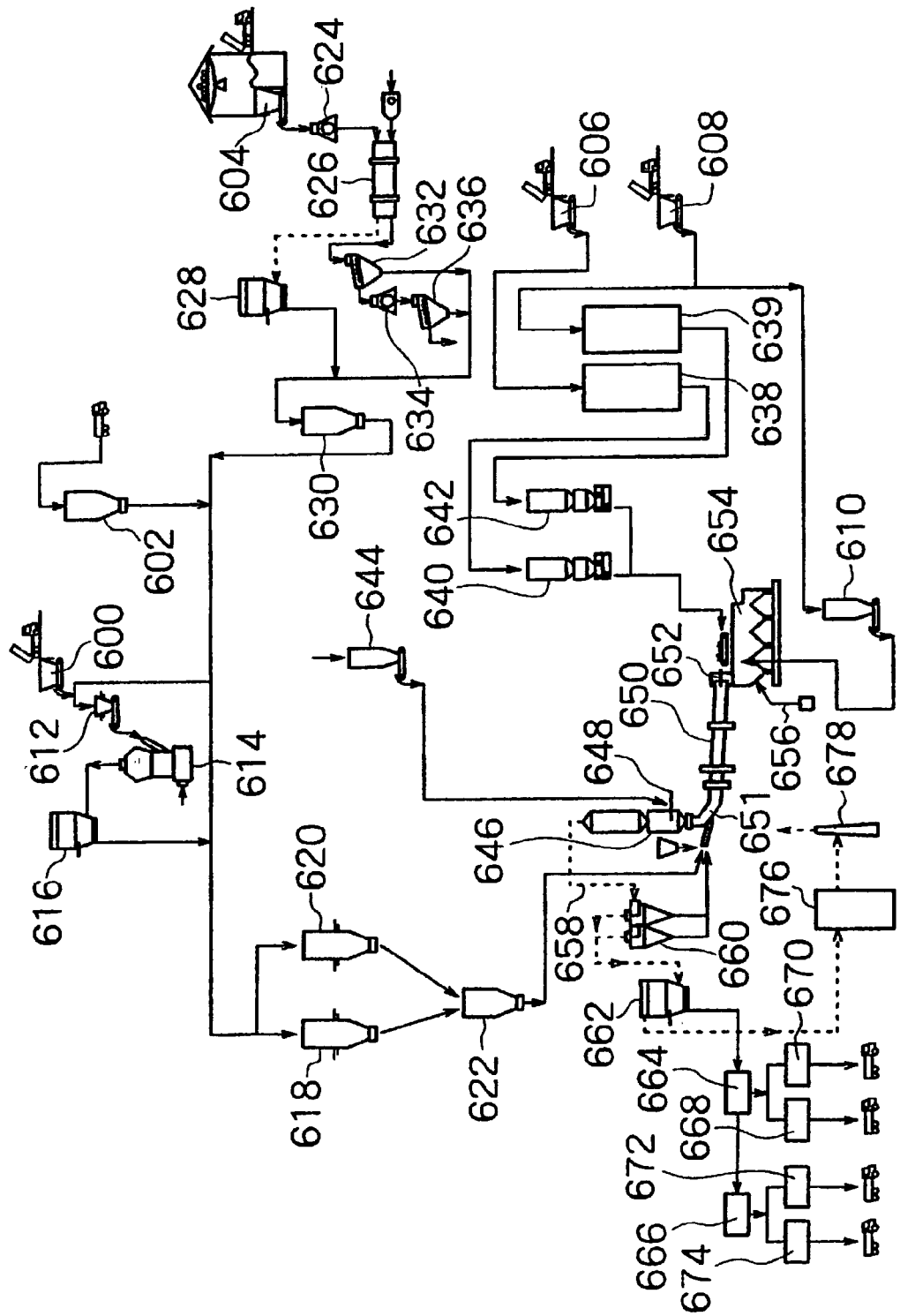
FIG. 6 is a conceptual drawing illustrating an outline of an embodiment of an integrated waste processing system working an integrated waste processing method in accordance with the present invention.

FIG. 6 is a conceptual diagram illustrating the system flow of an embodiment of an integrated processing device for working an integrated waste processing method in accordance with the present invention.

In FIG. 6, numerals 600 to 610 are storage facilities for the received waste.

In this embodiment, alkali metal-containing inorganic waste, such as waste glass that can be used as an alkali metal source, is one of the processed materials. In this embodiment, a waste glass storage tank 600 is provided. It is also possible to store waste of earthenware in this waste glass storage tank 600.

Moreover, as inorganic waste including heavy metals which is subjected to processing, it is possible to choose not only the above-mentioned municipal garbage incineration ash and incineration fly ash, but also melt furnace fly ash, soil polluted with heavy metals, oil, dioxins, or other organic compounds. These can be heated individually, or heated in mixtures of two or more. And, in this embodiment, these can be categorized as inorganic waste other than alkali metal-containing inorganic waste.

In this embodiment, an incineration fly ash storage tank 602 and an incineration ash storage tank 604 are provided as the storage facilities for such inorganic waste. In the incineration fly ash storage tank 602, incineration fly ash and melt furnace fly ash are stored. In the incineration ash storage tank 604, soil polluted with heavy metals, incineration ash and the like can be stored.

On the other hand, as mentioned above, examples of the chlorine-containing combustible materials that are subject to the processing in the present embodiment include scrapped polyvinyl chloride sheets that are used for greenhouses in the field of agriculture, polyvinyl products occurring as construction scraps, electric wiring and sheathing materials thereof, shredder dust due to the scrapping of cars, shredder dust due to the scrapping of electric household appliances, and so forth. In the present embodiment, a chlorine-containing combustible material tank 606 is provided as the storage facility for these.

Furthermore, in this embodiment, a chlorine-free waste plastic tank 608 and a wood chips tank 610 are provided as storage facilities for chlorine-free combustible waste.

The waste glass from the waste glass storage tank 600 is conveyed over a conveyor 612 to a glass crusher 614, together with defective products of cement raw material conveyed from a cooler 654. The crushed particles are blown up into a bag filter 616, and the particles themselves pass through the raw material mixing tanks 618 and 620 until they reach 622. Defective products are those in which the amount of chlorine or the like has not been reduced to the desired value, for example due to insufficient heat processing.

The raw material mixing tanks 618 and 620 also store the fly ash and the melt furnace fly ash from the fly ash storage tank 602.

Furthermore, the soil polluted with heavy metals or incineration ash from the incineration ash storage tank 604 is subjected to dry processing with a dry processing device 626, after passing through a crusher 624. The components with a relative fine particle size (particle size of not greater than 3 mm) are passed through a bag filter 628, and the powder components are fed into an intermediate tank 630. Moreover, the components with a coarse particle size are fed from a separator 632 to a crusher 634. Here, they are crushed, and the components with fine particle size (particle size of not greater than 3 mm) are fed into the intermediate tank 630 with a separator 636. Also the components stored in the intermediate tank 630 are fed into the raw material mixing tanks 618 and 620.

The chlorine-containing combustible material from the chlorine-containing combustible material tank 606 and the waste plastic from the chlorine-free waste plastic tank 608 are shredded with the waste plastic shredders 638 and 639, respectively. For example, they are shredded with a uniaxial shearing shredder with pusher mechanism, and pulverized with a uniaxial shearing shredder for pulverization. Thereafter, they are respectively stored in an intermediate tank 640 for chlorine-containing combustible material and an intermediate tank 642 for chlorine-free waste plastic.

Furthermore, in this embodiment, in order to input limestone as an auxiliary material, limestone is stored in the limestone tank 644. This limestone is input with the purpose of aiding the adsorption of acid gases, such as hydrogen chloride gas.

When the heat processed material, such as waste, is recycled as raw material for the building material industry, such as cement raw material, then it needs to be uniformly mixed with the other raw materials used for ordinary cement manufacturing. Therefore, the heat processed material of the present invention needs to be crushed. However, when all of the heat processed material is heated until it melts, then this leads to an increase of crushing energy.

On the other hand, when the heat processed material is heat processed and is discharged from the heating facility in powder form or partially melted clinker form, then it can be crushed with less energy, so that a reduction of the costs for recycling can be attained.

Thus, as a method for discharging the heat processed material after the processing in powder form or clinker form from the heating facility, the proportion of waste with abundant CaO components and $Al_2O_3$ components may be increased in a step of proportionally mixing prior to the input into the heating facility. Consequently, in the present embodiment, natural limestone is used as an auxiliary material.

In this embodiment, the nature of the processed material including alkali metal-containing inorganic waste and inorganic waste other than alkali metal-containing inorganic waste is monitored with a monitoring device not shown in the figure, with uniformity as the target. That is to say, with a fluorescent X-ray analysis device, the chlorine in the processed materials (including this inorganic waste), the $SO_3$ stemming from the processed materials that should appear in the exhaust gas, and the contained amount of alkali metals is ascertained. Thus, the proportioned raw materials to be sent to the subsequent heating facility can be adjusted so that they contain alkali metal components within a predetermined range. That is to say, when the mol number of the alkali metal included in the processed material is R, the mol number of the sulfur present as sulfate radicals in the processed material is S, and the mol number of the chlorine included in the processed material is Cl, then the amounts of the various inorganic wastes that are input are regulated such that the relation $$1 \leq (R-2S)/Cl \leq 1.2$$

is fulfilled. It should be noted that the alkali metals are consumed due to the presence of $SO_3$ (sulfate radicals), so that their amount is corrected by 2S. The chlorine is consumed also by heavy metals, but this amount is by far smaller than what is consumed by the alkali metals, so that no compensating term has been included in the equation. However, it is preferable to ascertain the amount of heavy metals contained. Examples of heavy metals that are included in relatively large amounts in waste are lead, copper and zinc. These volatilize as bivalent chlorides, so that when Me is taken as the sum of the mol numbers of these metals, it is possible to regulate in accordance with the following equation.

$$1 \leq (R+2Me-2S)/Cl \leq 1.2$$

The raw material mixing tanks 618 and 620 have the function of a mixture proportioning facility for proportioned raw material. Furthermore, a temporary storage tank 622 is used for adjusting the processing speed in the heating facility.

Then, in the present embodiment, limestone is given into a secondary furnace 646. The acid gas that could not be seized with the rotary kiln 650 is neutralized inside the secondary furnace 646. This secondary furnace 646 is a furnace with the purpose of secondary combustion, with a heavy oil burner 648, of the unburned portions included in the raw material that are scattered from the rotary kiln 650. Also the heavy oil that is consumed by the heavy oil burner 648 is an auxiliary material. The heat processed material (proportioned raw material) from the temporary storage tank 622 is input from the inlet hood 651 of the rotary kiln 650.

Thus, in the present embodiment, a rotary kiln is adopted for the heating facility. In the rotary kiln 650, toxic materials in the heat processed material stemming from waste are broken down or separated by heat processing.

It is preferable that the secondary furnace 646 and the rotary kiln 650 are taken as the heating facilities for the waste, and that the auxiliary materials given into these make up 5 to 40 wt % of the total input materials.

The heat processed material is heat processed inside the rotary kiln 650. The rotary kiln 650 is provided with a burner 652. Chlorine-containing combustible material from the intermediate tank 640 and chlorine-free waste plastic from the intermediate tank 642 is supplied as fuel to this burner 652. It is possible to further use waste oil as auxiliary fuel in addition to these combustible materials. If the heat amount obtained by the combustion of these kinds of waste alone is insufficient for the heat amount for the heat processing, then it is possible to use fuels such as pulverized coal or heavy oil as auxiliary materials. With regard to the blasting of these fuels, the nature of the combustible waste is monitored with a fluorescent X-ray analysis device as mentioned above to ascertain the amount of chlorine contained in the chlorine-containing combustible material. As mentioned above, the alkali metals included in the inorganic waste are also ascertained. Then, as described above, when the mol number of the alkali metals included in the processed material is R, the mol number of the sulfur present as sulfate radicals in the processed material is S, and the mol number of the chlorine included in the processed material is Cl, then the amounts of the various inorganic wastes that are input are regulated such that the relation $$1 \leq (R-2S)/Cl \leq 1.2$$

is fulfilled. It should be noted that the present invention can be worked also in the case that the inorganic waste itself includes chlorine. Consequently, it is preferable to monitor also the amount of chlorine contained in the heat processed material. By adjusting the input proportions of the various kinds of waste in the above-state manner, the cement raw material obtained by heat processing can be adjusted such that the contained amount of alkali metals is not greater than 2.0 wt %, preferably not greater than 0.75 wt %, and the amount of chlorine is not greater than 0.1 wt %, and preferably not greater than 500 ppm.

Depending on the nature of the chlorine-containing combustible material and the chlorine-free waste plastic, it may not be possible to input them as fuel of the burner 652. Thus, only the combustible waste with less than 5000 kcal/kg combustion calories is mixed with the inorganic waste and input. Furthermore, this material can be input directly into the inlet hood 651 without crushing.

In the rotary kiln 650, a heat source, such as the burner 652, is ordinarily arranged on the side opposite the supply side of the heat processed material, as described above, and the heat processed material is moved toward this heat source, whereas the combustion exhaust gas of the fuel is moved into a direction opposite from the transport direction of the heat processed material, that is, toward the supply side of the heat processed material. Consequently, if the heating facility is a rotary kiln, the heat processed material is moved successively from a low-temperature portion to a high-temperature portion in accordance with the rotation of the rotary kiln 650. Up to 1200° C., the greater part of the heavy metals is turned into chlorides and volatilizes, and is thus separated from the heat processed material. The heat processed material in which chlorine remains is subsequently moved toward the high-temperature portion of the rotary kiln 650.

It should be noted that in this case, the addition of substances containing alkali metal elements can be carried out continuously from the direction of the heat source of the rotary kiln, in accordance with the known technique of JP 2001-54775A. Together with the chlorine remaining in the heat processed material, the added alkali metal elements are easily turned into alkali metal chlorides at high temperature, and volatilized and separated from the heat processed material.

A sufficient harmlessness is attained by the heat processing, and the clinkers (heat processed material that has been processed) discharged from the rotary kiln 650 are given into a clinker cooler 654, and cooled by cooling air 656. Here, wood chips are given from the wood chips tank 610 over a chute not shown in the figure into the clinker cooler 654. They are then processed with cooling air heated by the clinkers. It is also possible to input chlorine-free combustible waste from the tank 608 together with the wood chips. This combustible waste has relatively few combustible calories. It does not have to be combusted completely.

The major part of the inorganic portions of the waste resulting when heavy metals, chlorine and alkali metals have been volatilized from the waste including heavy metals and chlorine is made up of minerals that are the main components of cement, such as calcium, iron, aluminum and silica. Consequently, after crushing, it can be recycled as raw material for the building material industry. In the present embodiment, it is recycled as cement raw material.

Depending on the types and the proportions of the waste, all of the heat processed material may be easily melted by heat processing of up to 1250° C. As noted above, a large amount of auxiliary materials may be necessary to discharge the heat processed materials in powder form or in clinker form from a heating facility, such as a rotary kiln. In this case, there is no need to discharge the heat processed material in powder form or in clinker form from the heating facility, and it may instead by discharged in melted form. After cooling, the heat processed material is a so-called melted slug, so that it can be utilized in that form or in crushed form as aggregates for construction work.

On the other hand, in this embodiment, exhaust gas is extracted from a line 658. The extracted exhaust gas is led from the extraction line 658 to a cyclone 660. Here, solid-gas separation is carried out, and coarse dust components which contain the main components of cement are returned to the rotary kiln 650. Fine dust and gaseous components which contain volatilized metal chlorides are fed into a bag filter 662. Immediately before it is fed into the bag filter 662, it is blasted with cooling air, so that the cooled heavy metal chlorides and alkali metal chlorides are solidified and present as solids in the dust with small particle diameter, and can be captured with the bag filter 662.

The fine dust components separated with the bag filter 662 include heavy metal chlorides and alkali metal chlorides. In this embodiment, the dust components are fed into a heavy metal collecting device 664.

Here, if the coarse dust in the exhaust gas that is discharged from the rotary kiln 650 reaches a large amount, the heavy metal concentration of the fine dust captured with the bag filter is reduced. For this reason, it may not be possible to ensure a product quality that is suitable for recycling, even when performing a heavy metal concentration process. Thus, the coarse dust in the exhaust gas is captured in the cyclone 660, and returned to the rotary kiln 650. That is to say, by separating dust with a small particle size to the fine powder side and waste with a coarse particle size to the coarse particle side, the heavy metal concentration in the dust on the fine powder side is increased.

For the heavy metal collecting device 664, it is possible to adopt any of the devices usually used by the person skilled in the art, such as a wet purification device or the like. For example, the low-melting point compounds in form of dust that have been collected are washed with water, subjected to a combination of acid/alkali elution and sulfide deposition and the like as suitable, and classified into raw materials for metal purification including copper components and lead components. Theses are selected in silos 668 and 670. It should be noted that it is also possible to separate zinc components, cadmium components, etc. Thus, it is possible to obtain artificial minerals. Furthermore, the filtrate and rinse water after collecting the heavy metals is sent to an alkali metal salt collecting device 666.

With the alkali metal salt collecting device 666, the alkali metal salts can be collected by a variety of methods. For example, they can be collected by the method of boiling the filtrate or the rinse water and putting it into an oversaturated state, thereafter cooling and precipitating it. In the course of this, due to differences in their dissolution properties, potassium chloride and sodium chloride can be separated. Consequently, it is possible to collect potassium chloride, which can be reused as fertilizer, for example. The separated potassium chloride is stored in a tank 672, and the separated sodium chloride is stored in a tank 674.

Here, the exhaust gas of the rotary kiln 650 has a rather high temperature, so that it can be used for dissolving the heavy metal salts in the heavy metal collecting device 664 and the alkali metal salt collecting device 666, and for evaporating and eliminating water.

In addition to the step of heavy metal separation/concentration by a wet method, this embodiment also includes a step of collecting salts from the salt water generated in that step. Considering their further recycling, it is preferable that the water content included in the artificial minerals and salts collected from these steps is removed. An advantageous utilization of energy is achieved by utilizing the heat generated by the heating facility for the elimination of the water content.

The gaseous components that have passed the bag filter 662 pass further through a detoxification processing facility 676, such as a denitrification and are discharged from a chimney stack 678.

The exhaust gas from which the dust has been captured with the bag filter 662 contains almost no harmful substances, such as hydrogen chloride or dioxin, but harmful substances can be eliminated completely with an exhaust gas processing facility to detoxify the exhaust gas. For the exhaust gas processing facility, any facility that can eliminate harmful substances can be used, such as a facility that detoxifies the exhaust gas by blowing in active carbon or calcium hydroxide to adsorb or dissolve harmful substances.

As a cooling facility for converting into solids the toxic materials present in liquid or gaseous form in the exhaust gas from the heating facility, it is possible to adopt not only a means of blasting cooling air as in the above-described embodiment, but also a means of spraying water.

As a dust collecting facility, it is possible to adopt not only a bag filter, but also a venturi scrubber.

Furthermore, if necessary, it is also possible to provide a foreign matter elimination facility for removing foreign matter from the processed material. As a pre-processing facility for transforming the processed material into a packing style suitable for processing it is possible to use any kind of shredder or crusher.

WORKING EXAMPLE 2

An integrated processing system was assembled for test purposes as shown in FIG. 6, except that it was not provided with a secondary furnace 646.

In terms of dry weight, 466.4 kg/h incineration ash, 621.9 kg/h incineration fly ash, 134.5 kg/h melting fly ash, and 151.3 kg/h waste glass were mixed, and given directly into the rotary kiln 650 from the temporary storage tank 622 shown in FIG. 6. With the object of adsorbing the HCl included in the kiln exhaust gas, 125.6 kg/h limestone was fed in from the limestone tank 644 in FIG. 6. That is to say, raw material was fed at a total rate of 1.5 t/h into the 1.8 m×28 m rotary kiln 650. On the other hand, 40.9 kg/h waste plastic with a chlorine content of less than 0.5 wt % and crushed to a particle size of not greater than 3 mm, 27.0 kg/h of waste polyvinyl chloride crushed to a particle size of not greater than 3 mm, and 153 kg/h regenerated oil are used as fuel, and fired at 1250° C. to 1300° C. As the product, the clinker and dust shown in Table 1 was obtained. After collecting copper, zinc and lead from the dust with a heavy metal collection device, NaCl and KCl were collected by crystallization from drainage water including salts discharged in the heavy metal collection step. The resulting clinker was used as raw material for a cement factory. The hydrogen chloride in the exhaust gas discharged from the chimney stack was 0 to 30 ppm for 12% oxygen partial pressure. Due to breaking down the dioxin in the exhaust gas inside the kiln and quenching from at least 600° C. to 200° C., the dioxin emission was not greater than 0.05 ng-TEQ/m³N.

close to 0.1 wt %, the usage amount of polyvinyl chloride was decreased and the usage amount of waste plastic was increased, thus regulating the chlorine amount in the clinkers and maintaining it at 0.1 wt % or less.

With the integrated waste process illustrated in FIG. 6, a plurality of wastes of different types and natures can be detoxified simultaneously and/or recycled.

That is to say, with this integrated process, harmful substances are separated from municipal garbage incineration ash or waste including heavy metals and chlorine, and thus can be recycled as raw material for the building material industry, for example for cement. Furthermore, it is possible to collect the separated artificial minerals and salts of heavy metals in a form that makes recycling easy, and new waste is not generated. And, combustible waste is also utilized by the heating facility. Consequently, there is no new pollution of the environment, and a complete integrated waste processing system can be devised, that does not necessitate final disposal, for example in landfills.

The present invention has been explained with the foregoing embodiments, but the present invention is not limited to these embodiments. All embellishments, modifications and additions that are obvious to the person skilled in the art are included in the technological scope of the present invention.

The specification, claims, drawings and abstract of Japanese Patent Application 2001-228964 (filed on Jul. 30, 2001) are incorporated in their entirety as a part of the description of the present invention.

The specification, claims, drawings and abstract of Japanese Patent Application 2002-049475 (filed on Feb. 26, 2002) are incorporated in their entirety as a part of the description of the present invention.

What is claimed is:

1. An integrated waste processing method for a waste processing system, wherein processed materials comprise alkali metal-containing inorganic waste, inorganic waste

TABLE 1

|  | t/d | water | $SiO_2$ | $Al_2O_3$ | $Fe_2O_3$ | CaO | MgO | $SO_3$ | $Na_2O$ | $K_2O$ | Cl | CuO | ZnO | PbO |
|---|---|---|---|---|---|---|---|---|---|---|---|---|---|---|
| mixed raw material | 1.5 | 1.6 | 20.27 | 7.92 | 2.71 | 30.05 | 1.90 | 2.26 | 5.03 | 2.57 | 5.75 | 0.18 | 1.23 | 0.44 |
| clinker | 1.0 | 0 | 29.81 | 11.68 | 3.99 | 44.17 | 2.80 | 0.78 | 0.44 | 0.00 | 0.08 | 0.03 | 1.36 | 0.00 |
| dust | 0.3 | 0 | 0.46 | 0.05 | 0.07 | 0.78 | 0.00 | 7.80 | 23.68 | 13.00 | 47.10 | 0.88 | 1.73 | 2.20 |

(units: wt %)

Method of Operation

The mixing proportions are roughly determined as stated above from the received amounts of incineration ash, incineration fly ash, melting fly ash and polyvinyl chloride that are input, and as for the used amount of waste plastic, about 30% of the kiln heat amount that can maintain the internal kiln temperature at 1250 to 1300° C. was substituted by polyvinyl chloride and waste plastic. Regenerated heavy oil was used as the heat source for the remaining about 70%. The addition amounts of limestone powder and waste glass were calculated in the following manner from the above input composition.

Limestone powder was added such that Ca/Cl=8, in order to capture the hydrogen chloride generated from the combustion of waste plastic. Waste glass was added such that (R−2S)/Cl=1.0 is fulfilled. Furthermore, the clinkers were sampled once every two hours during operation, fluorescent X-ray analysis was carried out, and the chlorine concentration and the alkali concentration in the clinkers was monitored. Especially, when the chlorine concentration became other than alkali metal-containing inorganic waste, chlorine-containing combustible material, and chlorine-free combustible waste, said method comprising regulating the respective amounts of the processed materials that are added to a waste heating facility, reacting a first portion of the chlorine included in the processed materials with a heavy metal in the processed materials, neutralizing a second portion of the chlorine by the alkali metal in the processed materials, and utilizing a heat amount obtained by combusting the chlorine-containing combustible material and the chlorine-free combustible waste as processing energy of the waste heating facility, while moving an obtained reaction product into exhaust gas and removing said obtained reaction product from the system.

2. The integrated waste processing method of claim 1, wherein, when R comprises a mol number of the alkali metal included in the processed materials, S comprises a mol number of sulfur present as sulfate radicals in the processed materials, and Cl is a mol number of the chlorine included in the processed materials, then the input amounts of the processed materials are regulated such that the mol numbers fulfill the relation $$1 < (R-2S)/Cl < 1.2.$$

3. The integrated waste processing method of claim 1, wherein 5 to 40 wt % of all material that is input into the waste heating facility is auxiliary material.

4. The integrated waste processing method of claim 1, including subjecting heavy metals included in dust obtained from the waste heating facility to a wet process, and concentrating and collecting the heavy metals.

5. The integrated waste processing method of claim 4, including collecting salts from drainage water discharged from the wet process.

6. The integrated waste processing method of claim 4, including using residual heat of the exhaust gas of the waste heating facility for evaporating and eliminating water components in a facility for wet processing the heavy metals included in the dust or a facility for collecting the salts, or for promoting dissolution of heavy metal salts.

7. The integrated waste processing method of claim 1, including discharging the processed materials after the heating process from the waste heating facility in powder form or in clinker form.

8. The integrated waste processing method of claim 1, including discharging the processed materials after the heating process from the waste heating facility in molten form.

9. The integrated waste processing method of claim 1, including adding a calcium compound into the waste heating facility as auxiliary material.

10. The integrated waste processing method of claim 1, including using a rotary kiln as the heating facility, and combusting the chlorine-containing combustible material and the chlorine-free combustible waste inside that rotary kiln, and cement raw material or a cement admixture is obtained.

11. The integrated waste processing method of claim 1, including adding the chlorine-free combustible waste into a cooler at a stage following the waste heating facility.

* * * * *